United States Patent

[11] 3,571,493

| [72] | Inventors | Charles E. Baker;<br>Jack J. Burch, Dallas, Tex. |
|---|---|---|
| [21] | Appl. No. | 676,786 |
| [22] | Filed | Oct. 20, 1967 |
| [45] | Patented | Mar. 16, 1971 |
| [73] | Assignee | Texas Instruments Incorporated<br>Dallas, Tex. |

[54] INTENSITY MODULATED LASER IMAGERY DISPLAY
26 Claims, 9 Drawing Figs.

[52] U.S. Cl. .................................................. 178/5.2,
178/5.4, 178/7.1
[51] Int. Cl. ..................................................... H04n 1/00,
H04n 1/46
[50] Field of Search............................................178/5.4, 7.5
(D), 7.3 (D), 7.1, 7.6, 6, 5.2 (A), 6.7, (Inquired)

[56] References Cited
UNITED STATES PATENTS

| 2,724,737 | 11/1955 | Hogan............................ | 178/5.4 |
| 2,915,582 | 12/1959 | Shapiro......................... | 178/6 |
| 2,962,545 | 11/1960 | Dillenburger................ | 178/5.4 |
| 3,303,276 | 2/1967 | Haeff............................. | 178/5.4 |
| 3,383,460 | 5/1968 | Pritchard...................... | 178/5.4 |
| 3,493,754 | 2/1970 | Black ............................ | 178/6.7 |

*Primary Examiner*—Richard Murray
*Assistant Examiner*—George G. Stellar
*Attorneys*—Samuel Mims, Jr, James O. Dixon, Andrew M. Hassell, Harold Levine, John E. Vandigriff, Rene' E. Grossman, Richards, Harris and Hubbard, V. Bryan Medlock, Jr, Harold E. Meier, Jerry W. Mills and Timothy L. Burgess ABSTRACT: Apparatus for producing a display of imagery including a laser generating a high-intensity collimated light beam which is intensity modulated by means of a light modulator and caused to sweep the image area by a light scanner. After the sweeping light beam passes through the imagery, it is focused by means of a condensing lens and partially reflected by means of a beam splitter to a light-sensitive detector. A signal generated by the detector is amplified and characterized into a control signal for the light modulator. Light passing through the beam splitter is focused by a projection lens on a display raster.

Patented March 16, 1971

INVENTORS
CHARLES E. BAKER
JACK J. BURCH

Harold E. Meier
ATTORNEY

Patented March 16, 1971

INTENSITY MODULATED LASER IMAGERY DISPLAY

This invention relates to imagery display and more particularly to imagery display by means of a high-intensity collimated light beam.

Display systems for reproducing imagery require bright, high resolution, viewing systems to insure accurate photo interpretation. Currently, rear projection viewers are commonly employed for this application. Rear projection viewers usually produce large screen displays which are viewed under high ambient light conditions. These systems, when so operated, demand higher intensity light sources than conventionally available at the present time. Also, conventional rear projection viewing systems are not conducive with real time processing operations of a type to provide enhanced imagery. Presently, enhanced imagery by means of automatic density compensation (or dodging) can be accomplished with cathode ray tubes only by employing an intermediate printing and developing step.

Automatic density compensation (or dodging as it is commonly known) is an important step in accurate photo interpretation. Assume that information encoded into patterns on imagery results in extreme density variations; for example, cloud patterns will reflect a great deal of optical energy and appear as very low densities on photographic positives while ground patterns will appear as high density areas. A bright cloud pattern causes the photo interpreter's iris to "stop down" to compensate for the brightness of a display. As a result, small bright patterns of interest adjacent to the cloud patterns may very easily be overlooked because the eye does not immediately readjust. Large shadowed areas in an otherwise bright background can also conceal points of interest in an uncompensated display system.

The principal disadvantage of the cathode ray tube automatic density compensation system is the limited light output of the tube. This prevents good direct photo interpretation and necessitates an intermediate printing and developing step. Such systems are also somewhat fragile in that they require a vacuum envelope and a special high persistence screen for display. Also, the light spot generated on the phosphor varies statistically, that is, it is noisy, and not a true point source which lowers the spatial resolution. Another significant shortcoming of a cathode ray tube system is that the generated light spot cannot be modulated over a wide range of intensities. Thus, an object of the invention is to provide an imagery display system wherein the intensity of the light spot can be varied over a wide range of intensities thereby permitting direct photo interpretation.

In accordance with one embodiment of this invention, a high-intensity collimated laser light beam scans the pattern of imagery and is modulated for automatic density compensation. By means of an optical system, the spot size illuminating the imagery in a dodging system is substantially larger than the resolution element of the imagery defined by the optical system to provide direct accurate photo interpretation. A feature of the present invention is to provide an imagery display system for accurate photo interpretation by means of a high-intensity light beam.

In accordance with another embodiment of the invention, the different density levels of black and white imagery are displayed in various colors assigned to particular density levels. Several light beams each having unique spectral characteristics are modulated in accordance with the density of the imagery and combined to scan the imagery for display. An example wherein multicolor display aids in photo interpretation is in the field of infrared imagery where the location of "hot spots" is desired. A particular advantage of color coding imagery with a system of this invention is that the light beam remains on the optical axis of the imaging lens. Thus, a higher spatial resolution is possible over systems where the light moves off the optical axis.

In accordance with a specific embodiment of the invention, a system is provided for reproducing imagery for display that includes a means for generating a high-intensity collimated light beam to illuminate said imagery and transmit the data therein to a display surface. A modulator varies the intensity of the collimated light beam in accordance with a feedback signal generated by a device responsive to the intensity of the light transmitted through the imagery. The modulated light beam sweeps across the image pattern by means of a light scanner to provide an accurate imagery display.

A more complete understanding of the invention and its advantages will be apparent from the specification and claims and from the accompanying drawings illustrative of the invention.

Referring to the drawings.

Figure 1:
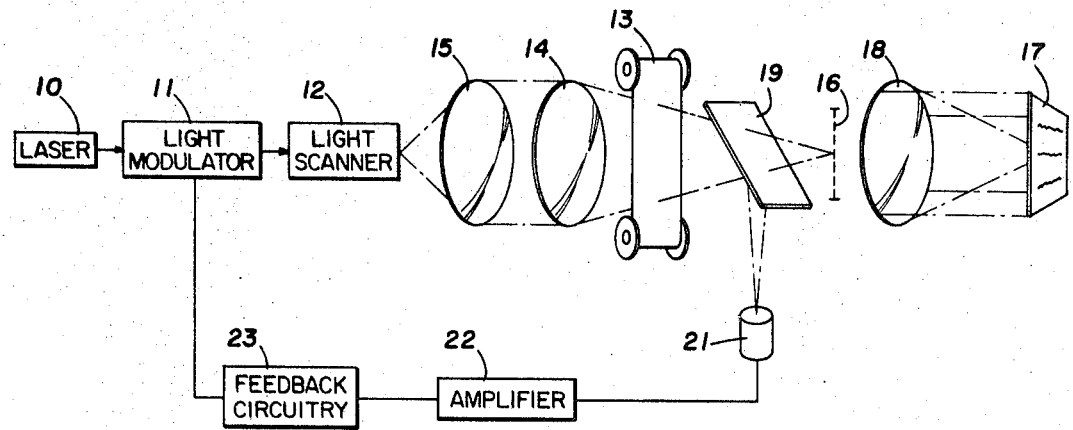
FIG. 1 is a schematic of a modulated light beam imagery display system with automatic density compensation.

Referring to FIG. 1, there is shown a high-intensity collimated light beam-dodging system for imagery display including a laser 10 generating a monochromatic coherent light beam that is intensity modulated by means of a light modulator 11. The modulated light beam is deflected by a light scanner 12 in a pattern that sweeps the area of imagery on a recording 13. A processing lens 15 collimates the light beam and a condensing lens 14 focuses the modulated light beam passing through the recording 13 on a spatial frequency plane 16 which may or may not contain a spatial frequency filter. Imagery data transmitted by the light beam is projected onto a screen 17 by means of a projection lens 18. In the system shown, the imagery pattern is displayed on a rear projection screen 17 which can be viewed in high ambient light conditions.

A portion of the light transmitted through the recording 13 is reflected by means of a beam splitter 19 to the light-sensitive surface of a detector 21 that generates an output signal proportional to the modulated intensity of the light beam transmitted through the imagery. Responsive to the signal generated by the light-sensitive detector 21 is a feedback amplifier 22 of a type well-known in the art as an operational amplifier. The feedback amplifier 22 is part of a feedback loop that includes a feedback network 23 which may or may not be part of the amplifier. If the amplifier 22 is the standard operational amplifier then the feedback network 23 consists of a feedback loop for the amplifier such as a plurality of resistors arranged to be individually connected in the amplifier feedback circuit. A resistor feedback network 23 operated with the standard operational amplifier 22 produces a linear control signal to the light modulator 11. When the system of FIG. 1 is used to display imagery by means of a dodging technique, a simple linear amplification in the feedback loop is sufficient. For special applications, some of which will be described, a nonlinear feedback element can also be considered.

Amplitude modulation of a light beam from the laser 10 can be effected by any one of many available devices either externally or internally within the laser cavity itself. An example of an external light modulator includes a configuration of KDP crystals operated under the influence of an electric field applied along the optic axis of the crystals. A typical electro-optic modulator includes an electro-optic body having a particular orientation relative to a preferred axis of polarization of the laser light. Linearly polarized light from a laser passes down the longitudinal axis of the electro-optic body and a modulation voltage applied to the electro-optic body and a modulation voltage applied to the electro-optic body causes a phase shift between the two components of the laser beam such that the polarization of the transmitted beam is elliptical. A quarter-wave plate, oriented perpendicular to the input polarized light, converts the varying elliptically polarized light into linearly polarized amplitude modulated light. A particularly thorough description of presently available external electro-optic light modulators is given in the article by J. B. Kaminow and E. H. Turner in the proceedings of the IEEE, Vol. 54, Oct. 1966, pages 1374—1388. In addition, the output intensity of a laser can be internally modulated by various techniques, such as a time varying perturbation of laser cavity losses. Instead of electro-optic methods, the loss perturbation technique utilizes the diamagnetic Faraday effects in glasses. Another internal cavity modulating technique is described in the U.S. Pat. No. 3,471,802 issued Oct. 7, 1969 and assigned to the assignee of the present invention. In the system of FIG. 1, the modulated laser light beam is used to compensate for the density pattern of the original imagery of the recording 13.

Development of methods of high speed, high resolution optical beam deflection has proceeded rapidly with the advent of the laser with its intense, highly collimated beam of light. External deflectors of the type which may be employed as the light scanner 12 include variable reflectors, variable refractors, birefringent deflectors, and interference deflectors. Some of the more important characteristics of the light scanner 12 are that it provides rapid deflection with low light loss, low optical phase front distortion, and high deflection accuracy. Two techniques that have been found to be suitable are the two-axis magnetostrictive transducers for mirror deflection and a galvanometer-driven moving mirror system. The exact requirements of the display and image processing system will determine which technique is most appropriate. For additional laser beam deflection techniques, reference is made to an article by V. J. Fowler et al., in the proceedings of the IEEE, Vol. 54, Oct. 1966, pages 1437—1444.

In operation, a gaussian-distributed spot of light illuminates and projects to the screen 17 small areas of imagery on the recording 13. This spot of light is modulated in intensity by the light modulator 11 and sweeps in a pattern across the area of imagery on the recording 13 by the light scanner 12. The beam splitter 19 reflects a small percentage of the projected light to the light-sensitive device 21 to generate a signal proportional to the average value of the light transmitted through the illuminated portion of the imagery pattern. A signal generated by the detector 21 is amplified by the amplifier 22, characterized by an appropriate feedback network 23, and coupled to the light modulator 11 in a manner to control the intensity of the transmitted light beam.

Figure 2:
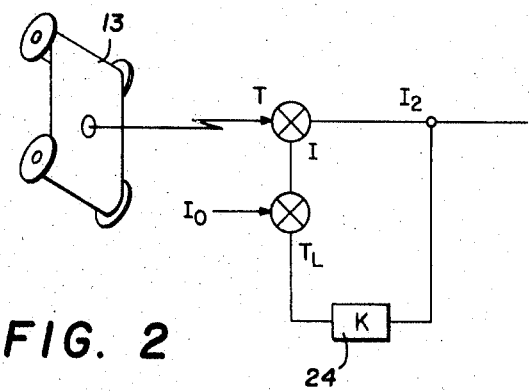
FIG. 2 is an equivalent circuit of the feedback loop of the imagery display system of FIG. 1.
Figure 4:
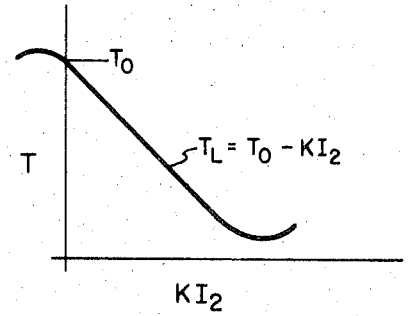
FIG. 4 is a plot of light intensity transmission through the light modulator of FIG. 1 versus a feedback proportionality constant.

An equivalent circuit for the feedback loop of the system of FIG. 1 is shown in FIG. 2 where the light intensity of the spot projected to the screen 17 is shown as a function of light intensity transmission through the imagery and the intensity of light from the modulator 11. Amplifier gain, attenuation constants, and all other operating characteristics of the feedback loop components including the light detector 21, the amplifier 22, and the feedback network 23 are combined in the constant K in the block 24. From the equivalent circuit of FIG. 2, the intensity of the light beam projected to the screen 17 at any instant of time can be described mathematically by the following three equations:

$$I_2 = TI \quad (1)$$
$$I = I_o T_L \quad (2)$$
$$T_L = T_o - KI_2 \quad (3)$$

where $I_2$ is the intensity of the spot projected on the screen 17, $T$ is the light intensity transmission of the imagery on the recording 13, $I$ is the intensity of the light beam from the modulator 11, $I_o$ is the laser light intensity, and $T_o$ is the light intensity transmitted through the modulator 11 with a zero feedback signal as shown by the curve of FIG. 4. FIG. 4 symbolizes a light transmission curve of a typical light modulator; operation is restricted to the straight line portion of this curve which can be described by equation (3).

Combining equations (1), (2) and (3), it can be shown that the spot intensity on the screen 17 is a factor of the proportionality constant, $K$, the light intensity transmission of the imagery, $T$, and the intensity of the laser light beam, $I_o$. Combining equations (1) through (3) the expression of spot intensity is given by the equation:

$$I_2 = TI_o(T_o - KI_2)$$
$$= TI_oT_o - TI_oKI_2$$

Transposing the $I_2$ term, equation (4) can be rewritten as:
$$I_2(1+TI_oK) = TI_oT_o$$
which can be simplified to:

$$I_2 = \frac{TI_oT_o}{1+TI_oK} \quad (5)$$

Figure 3:
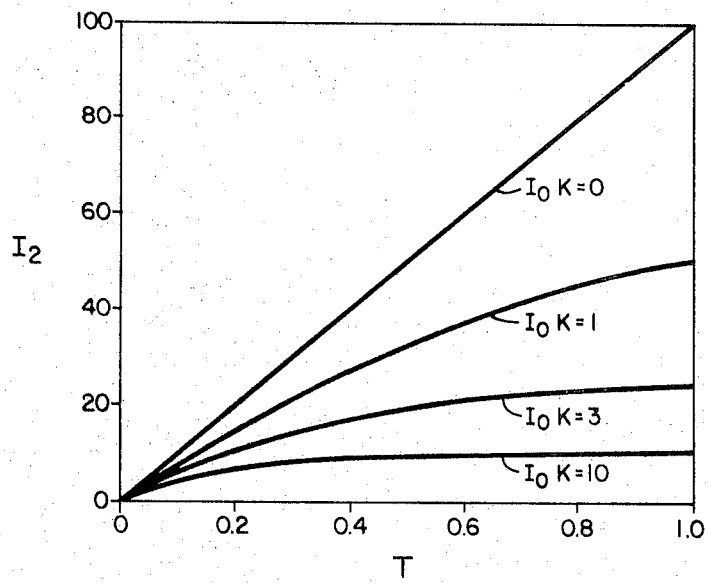
FIG. 3 is a plot of display intensity versus imagery transmission for several values of feedback.

Relationships between the intensity projected for the display, $I_2$, and light intensity transmission of the imagery, $I$, are illustrated in FIG. 3 for several values of $I_oK$. If $K$ equals zero, indicating no feedback, the intensity is linear with transmission and automatic density compensation (dodging) does not occur. As the value of $K$ increases, the variation of spot intensity on the screen 17 for changing values of imagery transmission decreases until when $I_oK$ equals 10 an increase in the imagery transmission produces only a slight increase in the spot intensity at the screen. To provide other amounts of dodging, the proportionality constant, $K$, is set such that the term $I_oK$ falls somewhere between zero and 10.

An additional degree of image processing may be performed with the system of FIG. 1 by utilizing the spatial frequency plane 16 formed at the focal plane of the condensing lens 14. The formation of a spatial frequency plane is greatly facilitated by the monochromatic and spatially coherent properties of a light beam generated by the laser 10. Conventional light sources generally provide numerous aberrations unless they are spectrally filtered and passed through a pinhole aperture to obtain a degree of spatial coherence. In general, the Fourier transform of illuminated imagery will be formed at a plane where an optical system refocuses a light beam expanding from a point source. For the special case of FIG. 1, the lens 15 collimates the light prior to passing through the lens 14 and the spatial frequency plane is formed at the focal plane of the lens 14. An article by A. Vander Lugt in the proceedings of the IEEE, Vol. 54, Aug. 1966, pages 1055 to 1063, describes in detail the formation of a Fourier transform by an optical system. The introduction of various density masks into the frequency plane 16 can be used to emphasize image characteristics such as edges and sharp discontinuities, discriminate against background with given spectral distributions, or remove scan lines introduced by the recording process. Spatial frequency filtering here assumes that the illuminated spot on the image is much greater in size than the smallest resolution element of the image. In the dodging techniques of FIG. 1 this assumption is valid.

Figure 5:
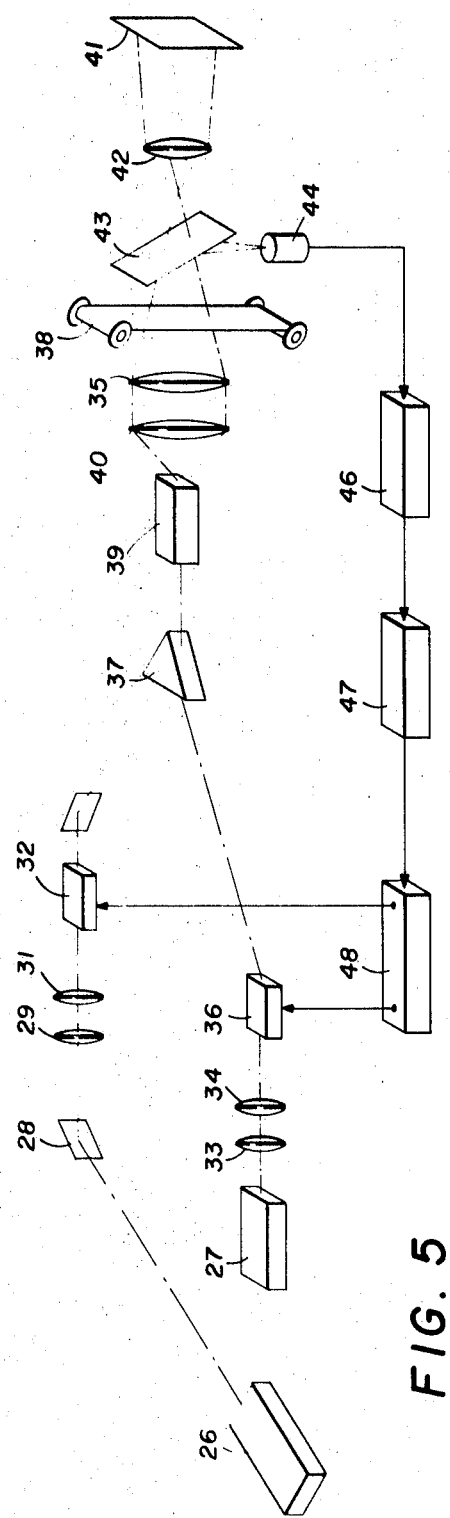
FIG. 5 is a schematic of a color-coding collimated light imagery display system.

Referring to FIG. 5, there is shown a system for encoding different density levels of black and white imagery into one of two colors generated by lasers 26 and 27. To color code in blue and red, the laser 26 may be an argon laser producing a light beam at 4,880 angstrom units and the laser 27 a helium-neon laser producing a light beam at 6,328 angstrom units. Light from the laser 26 is reflected from a mirrored surface 28 through collimating lenses 29 and 31. A light modulator 32 varies the intensity of the light beam generated by the laser 26 in a manner similar to that described previously with regard to the system of FIG. 1. A light beam from the laser 27 is collimated by lenses 33 and 34 and modulated by a light modulator 36. The light modulators 32 and 36 modulate their respective light beams inversely to one another; that is, if the modulated intensity through the modulator 32 is high then the modulated intensity of the light beam, through the modulator 36 is low and vice versa. The result is a light beam of constant intensity generated by combining the two laser beams in a prism 37. The constant intensity light beam from the prism 37 is collimated by a lens 40 and sweeps in a scanning pattern over the area of imagery in a recording 38 by means of a light scanner 39. Light transmitted through the recording 38 is focused on a spatial frequency plane by means of a condensing lens 35 and projected onto a screen 41 by means of a projecting lens 42.

A beam splitter 43 deviates a small percentage of the light transmitted through the recording 38 to a photomultiplier tube 44 or other suitable light detector which generates a signal proportional to the average value of the light intensity transmitted through the illuminated portion of the imagery. The photomultiplier tube 44 is part of a feedback circuit including an amplifier 46, a feedback network 47, and a voltage discriminator 48. The amplifier 46 and the feedback network 47 are similar to that described previously with regard to the system of FIG. 1. A signal generated by the amplifier 46 in conjunction with the feedback network 47 is analyzed and operated upon in the discriminator 48.

Figure 6:
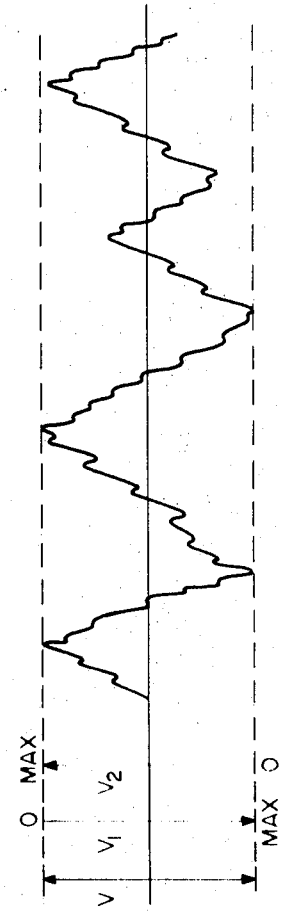
FIG. 6 is an illustration of a feedback voltage curve.

Assume the input signal, V, to the discriminator 48 has a time distribution such as shown in FIG. 6. For a two color-coding system, the discriminator 48 generates a first signal $V_1$ to the light modulator 32 and a second output signal $V_2$ to the light modulator 36. To generate a light beam of constant intensity from the prism 37, the signals $V_1$ and $V_2$ must vary inversely. Mathematically, the two control signals to the modulators 32 and 36 are given by the equations:

$$V_1 = C - V \quad (6)$$
$$V_2 = C + V \quad (7)$$

where $C \geq V \geq -C$. Thus, when the input signal to the discriminator 48 is equal to $C$ the signal $V_1$ is zero and the signal $V_2$ equal to 2C. The arrows of FIG. 6 show how $V_1$ and $V_2$ vary from zero to a maximum value for the feedback signal symbolized in FIG. 6.

A discriminator 48, for example, which might separate its input signal $V$ into a plurality of control signals can be synthesized by prior art electronic analogue computing elements. The required computing elements to generate two control signals, for example, are described in the textbook Electronic analogue and Hybrid Computers by G. A. Korn and T. M. Korn, McGraw-Hill, 1964, pages 6 and 7. Korn and Korn illustrate in FIG. 1—3 (a) on page 6 that an operational amplifier inverts a signal; that is, a signal of magnitude $V$ applied to an operational amplifier of unity gain would result in a signal of magnitude $-V$. In FIG. 1—3(b) on page 6, Korn and Korn illustrate how an operational amplifier forms the inverted sum of multiple input signals; that is, signals of magnitudes $-C$ and $-V$ applied to the inputs of an operational amplifier of unity gain would result in the signal $V_2 = C + V$. [ i.e. $V_2 = -(-C$ $31V)$ ]likewise signals, $-C$ and $V$ applied to an operational amplifier of unity gain would result in the signal $V_1 = C - V$. These two signals correspond to equations (6) and (7) above.

Figure 7:
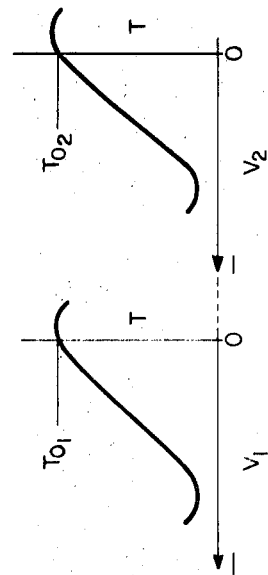
FIG. 7 shows the intensity of light transmitted through the modulators of FIG. 6 for the feedback signals connected thereto.

Since the light beam from the prism 37 must be substantially constant, the light intensity transmission through the modulators 32 and 36 must be similar. Referring to FIG. 7, there is shown a pair of curves of light intensity transmission versus control voltage for the modulators 32 and 36. Note these curves are similar such that for any values of $V_1$ and $V_2$ the combined intensity transmission is constant.

In operation, the system of FIG. 5 is similar to that of FIG. 1 with the exception that the light intensity projected to the screen 41 is constant with only the color varying with the transmission of the imagery. The constant or variable intensity beam being a function of the particular feedback circuitry. As explained above, for the color-coding system the feedback circuit generates the required modulator signals to provide a nearly constant projected light beam to the screen 41. It is also possible with the color-encoding system to employ more than two basic colors. For a three color system the voltage discriminator 48 is designed to generate three modulator control voltages the sum of which is always constant.

Figure 8:
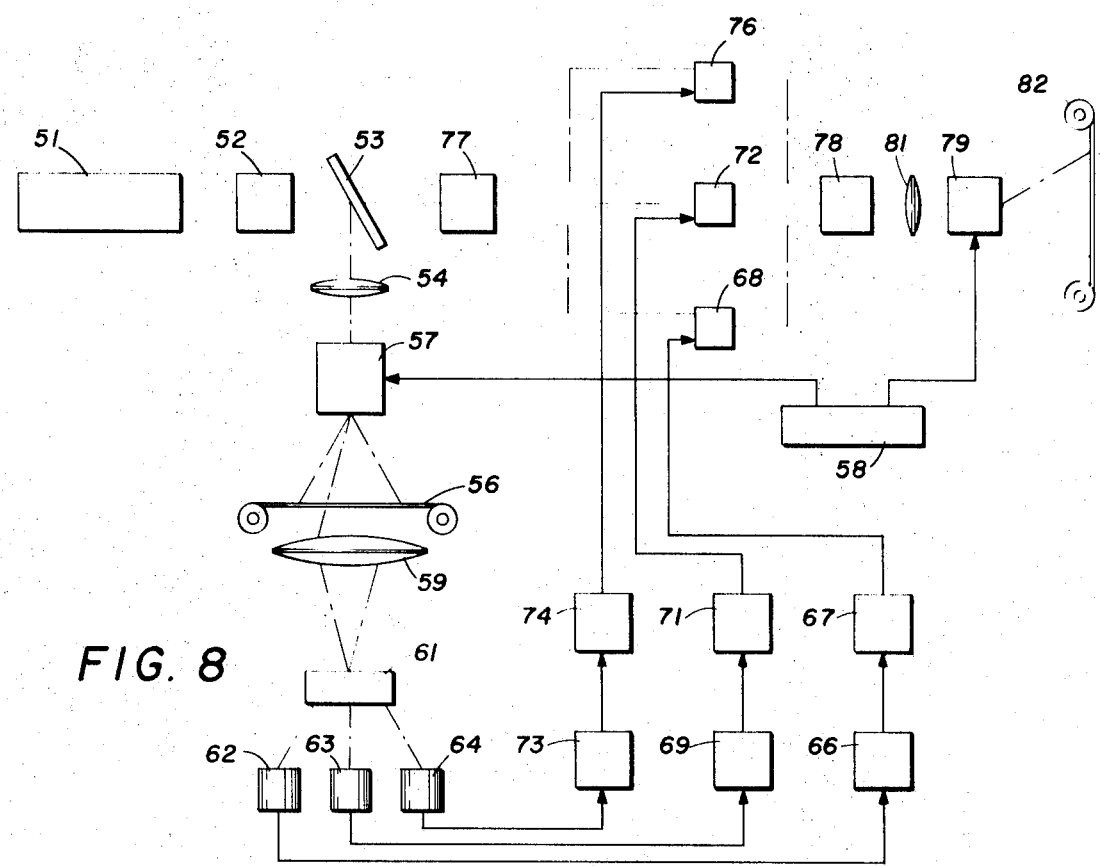
FIG. 8 is a schematic of a color display system employing a high-intensity collimated light beam.

Referring to FIG. 8, there is shown a modification of the system of FIG. 5 wherein color imagery can be color displayed. A multispectral laser 51 produces a light beam transmitted through a chromatic balance 52 and partially reflected by a beam splitter 53 to a collimating lens 54. Light transmitted through the collimating lens 54 sweeps in a scanning pattern across the area of imagery of the recording 56 by means of a scanner 57 in accordance with an input signal generated by a synchronizing oscillator 58. A condensing lens 59 focuses the light transmitted through the recording 56 to a spectral separator 61. Light entering the spectral separator 61 is divided into three spectrally different light beams transmitted to photomultipliers 62, 63 and 64. The intensity of the light beam incident upon each of the photomultipliers is determined by the intensity of one particular color in the beam incident upon the spectral separator 61. Each photomultiplier generates a signal proportional to the light incident thereon. The photomultiplier 62 is part of a control circuit including an amplifier 66 and a network 67 generating a control signal to a light modulator 68. The photomultiplier 63 is part of a control circuit including an amplifier 69 and a network 71 connected to a light modulator 72. Similarly, the photomultiplier 64 is part of a control circuit including an amplifier 73 and a network 74 producing an input signal to a light modulator 76.

Light incident upon the modulators 68, 72 and 76 is transmitted from a spectral separator 77 receiving light passing undeflected through the beam splitter 53. The modulated light beams from the modulators 68, 72 and 76 are combined in a prism 78 as a single beam transmitted to a scanner 79 through a lens 81. Light entering the scanner 79 sweeps in a pattern on a display raster 82 and is synchronized with the operation of the scanner 57 by means of scanning signals generated by the oscillator 58.

Again, the operation of the system of FIG. 8 is similar to that described previously with respect to FIGS. 1 and 5. A constant intensity light beam is projected to the screen 82 as described with respect to the color-encoding system of FIG. 5. This necessitates generating control signals to the modulators 78, 72 and 76 which, when combined, equals some fixed value. Synchronizing the scanners 57 and 59 insures that the same color and area of the imagery is being read and displayed at any instant of time.

Figure 9:
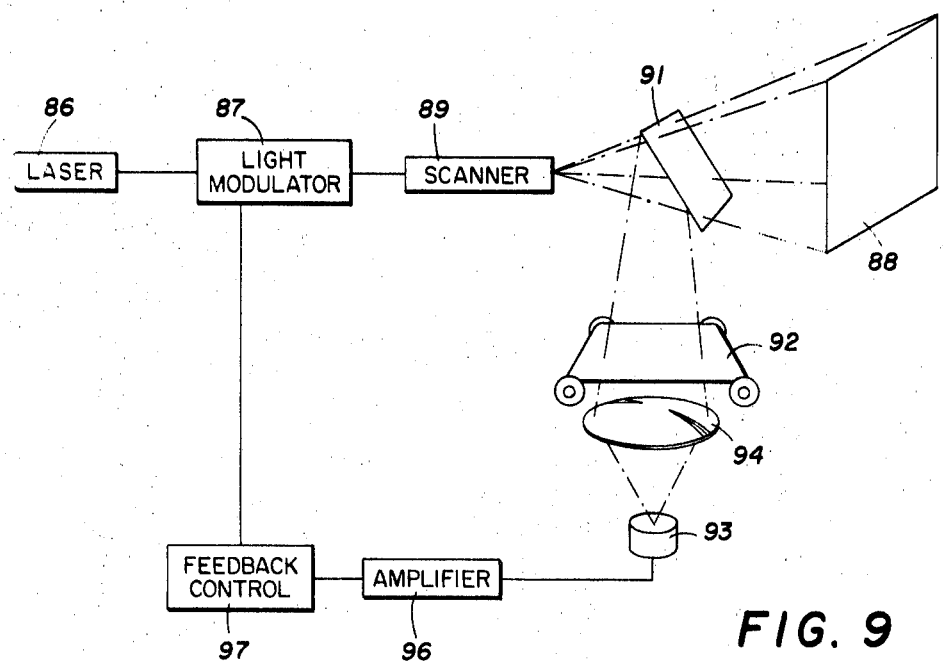
FIG. 9 is a schematic of a high-intensity display system.

Referring to FIG. 9, there is shown a system where very large amounts of energy are required for bright screen displays. A laser 86 generates a coherent collimated light beam modulated by a light modulator 87 of the type described previously. The modulated light beam sweeps across the screen display 88 by means of a scanner 89. A beam splitter 91 diverts a small portion of the light energy (perhaps 4 percent) available from the laser 86 through imagery on a recording 92. A light spot, having an area of about 1/2000 of the total display area, illuminating the imagery is focused on a photomultiplier tube 93 by means of a condensing lens 94. The photomultiplier tube 93 is part of a feedback circuit similar to that of FIG. 1 including an amplifier 96 and a feedback control 97.

With the system of FIG. 9, only a small portion of light incident upon the beam splitter 91 passes through the imagery of the recording 92. Where bright displays are required, passing the total light energy through the imagery reduces the optical efficiency and endangers the imagery pattern. This type of display could also be color coded as described with respect to FIG. 5.

While several embodiments of the invention, together with modifications thereof, have been described in detail herein and shown in the accompanying drawings, it will be evident that various further modifications are possible in the arrangement and construction of its components without departing from the scope of the invention.

We claim:

1. Apparatus for reproducing imagery for display comprising:

laser means for generating a high-intensity collimated light beam to illuminate said imagery and means for optically projecting the data therein to a display surface;

modulating means responsive to a control signal for varying the intensity of the collimated light beam;

scanning means for sweeping said light beam in a pattern across said imagery; and light responsive means sensitive to at least a portion of the light intensity transmitted through said imagery for generating a control signal to said modulating means proportional to the intensity of the modulated scanned light beam.

2. Apparatus for reproducing imagery as set forth in claim 1 further including a beam splitter positioned after said modulator and scanner for reflecting said portion of the modulated scanned light beam to said light responsive means.

3. Apparatus for reproducing imagery as set forth in claim 2 wherein said light responsive means includes a light detector and a feedback amplifier, said light detector generating a signal to said feedback amplifier having an output signal connected to said modulating means.

4. Apparatus for reproducing imagery for display comprising:
 laser means for generating a high-intensity collimated light beam to illuminate said imagery and transmit the data therein to a display surface;
 modulating means responsive to a control signal for varying the intensity of the collimated light beam;
 scanning means for sweeping said light beam in a pattern across said imagery;
 beam splitter means positioned after said modulator and scanner for reflecting a portion of the modulated scanned light beam; and
 light responsive means sensitive to said portion of the light intensity transmitted from said beam splitter means for generating a control signal to said modulating means proportional to the intensity of the modulated scanned light beam, said light responsive means including a light detector and feedback amplifier.

5. Apparatus for reproducing imagery as set forth in claim 27 wherein the moving light spot at said display surface has a spot size on the order of about 1/2000 of the display surface.

6. Apparatus for reproducing imagery as set forth in claim 27 wherein the intensity of the light beam at said display surface is given by the equation: $I_2 = TI_oT_o / 1+TI_ok$ where
 $T$ is the light intensity transmission of the imagery;
 $I_o$ is the laser light beam intensity;
 $T_o$ is the light intensity transmitted through said modulating means with zero feedback signal; and $K$ is a constant.

7. Apparatus for producing an intensity modulated display of imagery comprising:
 a laser generating a high-intensity collimated light beam to illuminate said imagery and transmit the data therein to a display surface;
 a light modulator for varying the intensity of the laser light beam in accordance with a feedback signal;
 a light deflector for moving the modulated laser light beam across said imagery;
 a condensing lens in optical relationship with the modulated deflected light beam for generating the Fourier transform of said imagery;
 a projection lens for focusing the modulated light beam on said display surface; and
 light responsive means sensitive to at least a portion of the light intensity transmitted through said imagery for generating a feedback signal to said light modulator proportional to the modulated scanned intensity of said laser light beam.

8. Apparatus for producing an intensity modulated display as set forth in claim 7 further including a beam splitter positioned after said modulator and scanner for directing said portion of the modulated scanned laser beam to said light responsive means.

9. Apparatus for producing an intensity modulated display as set forth in claim 8 wherein said light responsive means includes a light-sensitive detector and a feedback amplifier, said detector generating an input signal to said feedback amplifier having an output signal connected to said light modulator.

10. Apparatus for producing an intensity modulated display as set forth in claim 7 including a spatial frequency filter positioned in the modulated light beam at the reimaging plane of said condensing lens to filter the data transmitted from said imagery.

11. Apparatus for producing a color coded display of imagery comprising:
 means for generating a multiple wavelength high-intensity collimated light beam to illuminate said imagery and transmit the data therein to a display surface;
 modulating means for independently modulating the intensity of each spectral component of said multiple wavelength light beam in accordance with input signals for each of said components;
 scanning means for sweeping said modulated light beam across said imagery;
 light responsive means sensitive to at least a portion of the light intensity transmitted through said imagery for generating a signal proportional to the intensity of said modulated scanned light beam; and
 a feedback network responsive to the generated signal of said light responsive means for separating said signal into a plurality of control signals individually connected to said modulating means to vary the intensity of one spectral component.

12. Apparatus for producing a color coded display as set forth in claim 11 further including a beam splitter positioned after said modulator and scanner for directing said portion of said modulated scanned light beam to said light responsive means.

13. Apparatus for producing a color coded display as set forth in claim 11 wherein said imagery is an infrared recording and said feedback network separates the signal from said light responsive means into modulator control signals in accordance with the degree of infrared emission recorded on said imagery.

14. Apparatus for producing a color coded display set forth in claim 13 including a condensing lens in optical relationship with the modulated scanned light beam transmitted through said imagery to form the Fourier transform of the recorded data;
 a spatial frequency filter for filtering the data recorded on said imagery; and
 a projection lens for focusing the filtered modulated scanned light beam on said display surface.

15. Apparatus for producing a color coded display of imagery comprising:
 means for generating a multiple wavelength high-intensity collimated light beam to illuminate said imagery and transmit the data therein to a display surface;
 means for spectrally separating said multi wavelength light beam into its spectral components;
 a plurality of light modulators individually positioned in one component beam for varying the intensity of that spectral component;
 means for recombining said modulated spectral components into a single multi wavelength modulated light beam;
 scanning means for sweeping said modulated light beam in a pattern across said imagery;
 light responsive means for generating a signal proportional to the modulated intensity of said recombined light beams; and
 a feedback network responsive to the generated signal of said light responsive means for separating said signal into a plurality of control signals individually connected to one of said light modulators.

16. Apparatus for producing a color coded display of imagery comprising:
 a plurality of light generating means each producing a high-intensity collimated light beam at a different wavelength to illuminate said imagery and transmit the data therein to a display surface;
 a plurality of light modulators individually positioned in one of said light beams for varying the intensity thereof;

means for combining said plurality of collimated light beam into a single modulated collimated light beam;

scanning means for sweeping said light beam in a pattern across said imagery;

a beam splitter positioned so as to reflect at least a portion of said light beam to said light responsive means;

light responsive means sensitive to said portion for generating a signal proportional to the modulated intensity of said combined collimated light beam; and amplifying means responsive to the signal generated by said light responsive means and generating a plurality of output signals to control said light modulators.

17. Apparatus for reproducing imagery for display comprising:

a laser generating a high-intensity collimated light beam to illuminate said imagery and transmit the data therein to a display surface;

a light modulator for varying the intensity of the laser light beam in accordance with an input signal;

scanning means for moving said light beam in a pattern across said imagery;

a beam splitter for reflecting a portion of said light beam to be transmitted through said imagery;

light responsive means for generating a signal proportional to the light transmitted through said imagery; and feedback means responsive to the signal generated by said light responsive means and having an output signal connected to said light modulator.

18. Apparatus for reproducing imagery as set forth in claim 17 including a condensing lens for focusing the light transmitted through said imagery on said light responsive means.

19. Apparatus for reproducing color imagery on a color coded display comprising:

means for generating a multiple wavelength high-intensity collimated light beam to illuminate said imagery and transmit the data therein to a display surface;

a beam splitter positioned so as to reflect a portion of said light beam to be transmitted through said imagery;

scanning means for sweeping the reflected portion of said light beam in a pattern across the area of said imagery;

means for spectrally separating the light beam transmitted through said imagery into its spectral components;

a plurality of light responsive means individually positioned in one component beam for generating a control signal proportional to the intensity of a single spectral component;

means for spectrally separating the unreflected portion of said multiple wavelength light beam transmitted through said beam splitter into its spectral components;

a plurality of light modulators individually positioned in one component beam of said unreflected light beam for varying the intensity of that spectral component in accordance with a respective control signal from one of said light responsive means;

means for recombining said modulated spectral components into a single multiple wavelength modulated light beam; and second scanning means for sweeping said modulated light beam in a pattern across the display surface.

20. Apparatus for reproducing color imagery as set forth in claim 19 including synchronizing means generating scanning signals to said first and second scanning means to synchronize the operation thereof.

21. Apparatus for reproducing color imagery as set forth in claim 20 indicating a chromatic balance positioned in said multiple wavelength light beam between said means for generating and said beam splitter.

22. Apparatus for reproducing color imagery as set forth in claim 21 wherein said light beam-generating means is a laser-producing multiple spectral components.

23. A method of producing a display of imagery comprising:

generating a high-intensity laser collimated light beam for illuminating said imagery and optically projecting the data therein to a display surface;

modulating said high-intensity collimated light beam in accordance with a feedback signal;

scanning said modulated light beam in a pattern across said imagery; and generating a feedback signal proportional to the intensity of the modulated light beam transmitted through said imagery.

24. A method of producing a display of imagery as set forth in claim 23 including reflecting a portion of the modulated light beam transmitted through said imagery for generating said feedback signal.

25. A method of producing a display of imagery comprising:

generating a high-intensity collimated light beam for illuminating said imagery and transmitting the data therein to a display surface;

modulating said high-intensity collimated light beam in accordance with a feedback signal;

scanning said modulated light beam in a pattern across said imagery;

reflecting a portion of the modulated light beam transmitted through said imagery for generating a feedback signal proportional to the intensity of the modulated light beam transmitted through said imagery; and generating the Fourier transform of the data recorded on said imagery.

26. A method of producing a display of imagery as set forth in claim 25 including filtering the modulated light beam transmitted through said imagery to remove unwanted data.